United States Patent [19]

Morishita et al.

[11] Patent Number: 5,054,329
[45] Date of Patent: Oct. 8, 1991

[54] STARTER MOTOR PINION SHAFT OIL SEAL

[75] Inventors: Akira Morishita; Shuzoo Isozumi; Takao Tanaka, all of Hyogo, Japan

[73] Assignee: Mitsubishi Denki Kabushiki Kaisha, Tokyo, Japan

[21] Appl. No.: 466,846

[22] Filed: Jan. 18, 1990

[30] Foreign Application Priority Data

Jan. 19, 1989 [JP] Japan .................. 1-5874[U]
Jan. 19, 1989 [JP] Japan .................. 1-5875[U]
Feb. 1, 1989 [JP] Japan .................. 1-11610[U]
Feb. 14, 1989 [JP] Japan .................. 1-16012[U]
Feb. 17, 1989 [JP] Japan .................. 1-38680

[51] Int. Cl.$^5$ .............. F02N 15/06; F16C 33/00; F02F 5/00
[52] U.S. Cl. .................. 74/7 R; 74/7 A; 74/7 E; 277/152; 384/147; 384/484
[58] Field of Search ............ 74/7 R, 7 A, 7 E; 277/152; 384/147, 484

[56] References Cited

U.S. PATENT DOCUMENTS 2,761,710  9/1956  Rudner ............... 277/152 X
4,808,836  2/1989  Isozumi et al. .......... 290/48
4,895,035  1/1990  Okamoto et al. ......... 74/7 A Primary Examiner—Leslie A. Braun
Assistant Examiner—David W. Laub
Attorney, Agent, or Firm—Sughrue, Mion, Zinn, Macpeak and Seas

[57] ABSTRACT

A starter motor which is improved in waterproof performance. The starter motor comprises an output rotary shaft, a stationary frame, a ball bearing secured to the frame, and a clutch pinion moving member mounted in a coaxial relationship to the rotary shaft between an outer periphery of the rotary shaft and the ball bearing for sliding movement over a predetermined distance in an axial direction thereof. The clutch pinion moving member has a pinion at a front end thereof, and an oil seal is mounted at a location on the frame forwardly of the ball bearing and extending toward the clutch pinion moving member to seal a location between the frame and the clutch pinion moving member. The oil seal has a radial section of an L-shape having an axial side and a radial side extending from a front end of the axial side. It may have a plurality of axially extending drain slots or drain holes formed in a circumferentially spaced relationship on an inner periphery of the axial side thereof. Various other forms of starter motors are also disclosed.

2 Claims, 9 Drawing Sheets

STARTER MOTOR PINION SHAFT OIL SEAL

BACKGROUND OF THE INVENTION

1. Field of the Invention

This invention relates to a starter motor, and more particularly to a starter motor having an oil seal which slidably contacts with a pinion moving member.

2. Description of the Prior Art

FIG. 18 is a sectional view showing part of an exemplary one of conventional starter motors. Referring to FIG. 18, the starter motor shown includes an output rotary shaft 1 connected to an armature rotary shaft 3 of the motor by way of an epicycle reduction bear 2. A helical spline 1a is formed on an outer periphery of the output rotary shaft 1, and an overrunning clutch 4 is spline fitted on the helical spline 1a. A pinion driving shaft 5 is formed in an integrated relationship with an inner member of the overrunning clutch 4 and mounted for axial sliding movement and for integral rotation on the output rotary shaft 1, and a pinion 6 is formed at an end of the pinion driving shaft 5, thereby forming a pinion moving member. A ball bearing 7 with a seal is fitted in a front bracket 8 which makes part of a machine frame of the starter motor. The ball bearing 7 receives an outer periphery of the pinion driving shaft 5 for axial sliding movement and for rotation relative to the front bracket 8. The front bracket 8 has a front end portion which extends forwardly in a tubular configuration such that it covers over an outer periphery of the pinion 6. An oil seal 9 made of rubber is disposed at a location in the front bracket 8 on the front side of the ball bearing 7 such that it slidably contacts at a lip face at an inner circumferential end edge thereof with an outer peripheral face of the pinion driving shaft 5. The oil seal 9 is constituted such that, as shown more particularly in FIG. 19, it is fixed at an outer circumferential fixing portion 9a thereof to the front bracket 8 and a rear wall 9b extends inwardly from a rear end of the outer circumferential fixing portion 9a, and a contacting portion 9c extends obliquely forwardly from a radially inner end of the rear wall 9b and terminates in the lip face. Thus, the oil seal 9 has a cross section having a forwardly open channel shape as seen in FIG. 19.

A sleeve bearing 10 is disposed on an inner periphery of the pinion driving shaft 5 for supporting the output rotary shaft 1 thereon. The output rotary shaft 1 has a stopper 11 mounted at a front end portion thereof for abutting with a shoulder 5a of the pinion driving shaft 5 to stop axial movement of the pinion driving shaft 5 in the forward direction. Further, a cap 12 having a channel-shaped cross section is mounted in an inner periphery of a forward end portion of the pinion 6 such that it covers an opening at the front end of the pinion 6.

The starter motor further includes an electromagnetic actuator 13 in the form of a solenoid, and a lever 14 mounted for pivotal motion and having one end held in engagement with a plunger 15 of the electromagnetic actuator 13 and the other end held in engagement with a rear side of the overrunning clutch 4.

In operation, when the electromagnetic actuator 13 is energized, the plunger 15 is attracted to pivot the lever 14 to move the overrunning clutch 4 forwardly. Consequently, the pinion driving shaft 5 is moved axially forwardly to move the pinion 6 into meshing engagement with a ring gear of an internal combustion engine not shown. Meanwhile, as a result of such energization of the electromagnetic actuator 13, the motor is energized to start its rotation, and rotation of the armature rotary shaft 3 is transmitted to the output rotary shaft 1 by way of the epicycle reduction bear 2 and further to the pinion driving shaft 5 by way of the overrunning clutch 4 so that the pinion 6 is rotated and the engine is started by way of the pinion 6. After starting of the engine, the electromagnetic actuator 13 is deenergized, and the pinion 6 is returned to its original position by a return spring not shown disposed suitably in the front bracket 8.

In the conventional starter motor having such a construction as described above, the oil seal 9 is provided for waterproof and dust-proof features for sliding contact portions of the ball bearing 7 and the pinion driving shaft 5 and for the inside of the front bracket 8. Since the oil seal 9 has such an inwardly concave channel-shaped section as described above, water which may be admitted from the front side is likely to accumulate in a spacing 9d defined by the oil seal 9 and the front bracket 8. Besides, since another spacing is defined between a front end portion 8a of the front bracket 8 and the pinion 6, water is likely to accumulate also in the spacing. In case heat is applied, in addition to vibrations or fine motion of the pinion 6, to such accumulated water, then the water may be admitted into the inside of the motor and cause various problems that internal parts of the motor may suffer from rust, that the sliding contact portion of the pinion driving shaft 5 may suffer from rust to cause insufficient sliding movement thereof, that the inside mechanism of the starter motor may be wet with water and suffer from insufficient operation of the motor, and so forth. Those problems are particularly remarkable where the pinion 6 of the starter motor is mounted in a vertically upward orientation or in an upwardly inclined orientation.

SUMMARY OF THE INVENTION

It is an object of the present invention to provide a starter motor which is improved in waterproof performance.

In order to attain the object, according to one aspect of the present invention, there is provided a starter motor which comprises an output rotary shaft, a stationary frame, a ball bearing secured to the frame, a clutch pinion moving member mounted in a coaxial relationship to the rotary shaft between an outer periphery of the rotary shaft and the ball bearing for sliding movement over a predetermined distance in an axial direction thereof, the clutch pinion moving member having a pinion at a front end thereof, and an oil seal mounted at a location on the frame forwardly of the ball bearing and extending toward the clutch pinion moving member to seal a location between the frame and the clutch pinion moving member, the oil seal having a radial section of an L-shape which has an axial side and a radial side which extends from a front end of the axial side. Preferably, at least part of the oil seal is made of rubber, or at least an end portion of the radial side of the L-shape of the oil seal is made of rubber. The frame may have a drain hole formed therein in a communicating relationship to a location forwardly of the oil seal. The frame may have a flanged portion extending radially inwardly from a front end thereof, and the oil seal may be disposed in a contacting relationship with an inside face of the flanged portion such that the radial side of the L-shape thereof extends from a portion of the oil seal at which the oil seal contacts with the inside face of the flanged portion to a lip portion of the oil seal at which the oil seal slidably contacts with an outer periphery of the pinion moving member. Preferably, a resilient member is fitted on an outer periphery of the pinion moving member and covers over a front face of the ball bearing.

With the starter motor, a defined spacing in which water may possibly accumulate is not present in front of the oil seal. Consequently, such water which may come to the oil seal will flow away from the oil seal soon and hence will not be admitted into the inside of starter motor even upon vibrations. Accordingly, a high waterproof property is assured.

According to another aspect of the present invention, there is provided a starter motor which comprises an output rotary shaft, a stationary frame, a ball bearing secured to the frame, a clutch pinion moving member mounted in a coaxial relationship to the rotary shaft between an outer periphery of the rotary shaft and the ball bearing for sliding movement over a predetermined distance in an axial direction thereof, the clutch pinion moving member having a pinion at a front end thereof, and an oil seal mounted at a location on the frame forwardly of the ball bearing and extending radially toward the clutch pinion moving member to seal a location between the frame and the clutch pinion moving member, the oil seal having an axial side and a radial side which extends from a rear end of the axial side, the oil seal having a plurality of axially extending drain slots or drain holes formed in a circumferentially spaced relationship on an inner periphery of the axial side thereof. Preferably, the frame has a plurality of drain slots or drain holes formed therein in a communicating relationship with the drain slots or drain holes of the oil seal.

With the starter motor, where it is mounted with the pinion directed upwardly or in an upwardly inclined condition, even if water comes to an outer end portion of the oil seal from the outside, such water will flow away soon by way of the drain slots or drain holes in the axial side of the oil seal and also by way of the drain slots or drain holes in the frame. Consequently, admission of water into the inside of the starter motor is prevented. Accordingly, insufficient sliding movement of the pinion moving member or insufficient operation of the starter motor which may otherwise be caused by rust can be eliminated.

According to a further aspect of the present invention, there is provided a starter motor which comprises an output rotary shaft, a stationary frame, a ball bearing secured to the frame, a clutch pinion moving member mounted in a coaxial relationship to the rotary shaft between an outer periphery of the rotary shaft and the ball bearing for sliding movement over a predetermined distance in an axial direction thereof, the clutch pinion moving member having a pinion at a front end thereof, and an oil seal mounted at a location on the frame forwardly of the ball bearing and extending radially toward the clutch pinion moving member to seal a location between the frame and the clutch pinion moving member, the frame having a radially inwardly extending flanged portion at a front end thereof, the oil seal being disposed in a contacting relationship with an inside face of the flanged portion, the oil seal terminating in a lip portion at which the oil seal slidably contacts with an outer periphery of the pinion moving member.

With the starter motor, in which orientation it is installed, a defined spacing in which water may accumulate is not present in front of the oil seal. Consequently, such water which may come to the oil seal will flow away from the oil seal soon and hence will not be admitted into the inside of starter motor even by vibrations. Accordingly, no such situation will take place that rust may be produced on the bearing or insufficient operation of the starter motor may be resulted.

According to a still further aspect of the present invention, there is provided a starter motor which comprises an output rotary shaft, a stationary frame, a ball bearing secured to the frame, a clutch pinion moving member mounted in a coaxial relationship to the rotary shaft between an outer periphery of the rotary shaft and the ball bearing for sliding movement over a predetermined distance in an axial direction thereof, the clutch pinion moving member having a pinion at a front end thereof, and a resilient member fitted on an outer periphery of the pinion moving member forwardly of the ball bearing for covering over a front face of the ball bearing.

With the starter motor, even when water comes toward the ball bearing from the front side, it is prevented from advancing into sliding contact portions of the ball bearing and the pinion moving member by the resilient member. Consequently, such possibility as occurrence of rust can be prevented.

According to a yet further aspect of the present invention, there is provided a starter motor which comprises an output rotary shaft, a stationary frame, a ball bearing secured to the frame, a clutch pinion moving member mounted in a coaxial relationship to the rotary shaft between an outer periphery of the rotary shaft and the ball bearing for sliding movement over a predetermined distance in an axial direction thereof, the clutch pinion moving member having a pinion at a front end thereof, an oil seal secured to the frame at a location forwardly of the ball bearing and having a lip held in contact with an outer periphery of the pinion moving member, the pinion moving member having an annular groove formed on the outer periphery thereof at a location forwardly of the oil seal when the pinion moving member is in its retracted home position, and a checking ring made of a resilient material and fitted in the annular groove, the checking ring having an outwardly extending disk-shaped portion which covers over the front side of the lip portion of the oil seal.

With the starter motor, water coming from the outside will be prevented from entering the inside of the starter motor by the disk-shaped portion of the checking ring which covers over the front side of the lip portion of the oil seal. Further, the frame to which the bearing is secured in advance can be assembled to the pinion moving member which has the checking ring fitted in advance in the annular groove of the pinion moving member because the checking ring is resiliently deformed to retreat into the annular groove. After the bearing passes by the checking ring, the checking ring is resiliently returned to its original shape by its own resiliency. Accordingly, assembly of the starter motor is facilitated. Besides, the checking ring will be assembled with certainty.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENTS

Figure 1:
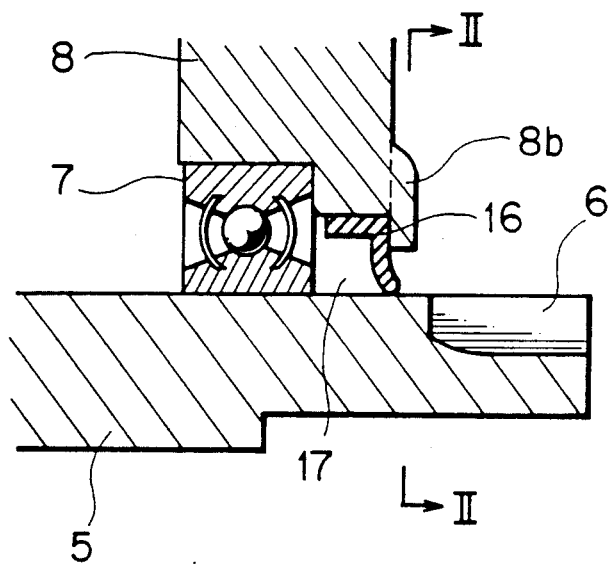
FIG. 1 is a sectional view of part of a starter motor showing a first embodiment of the present invention.
Figure 2:
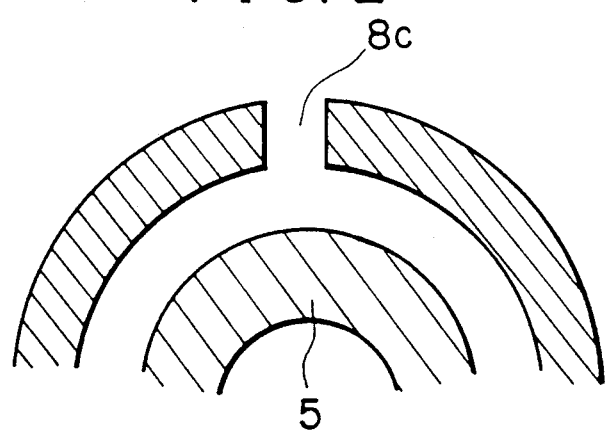
FIG. 2 is a sectional view taken along line II—II of FIG. 1.
Figure 3:
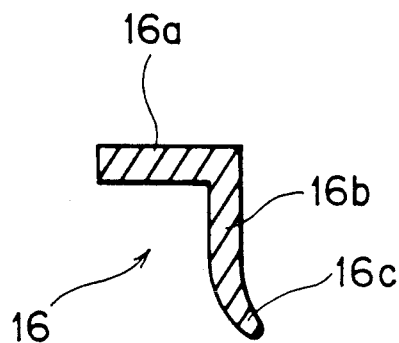
FIG. 3 is an enlarged sectional view of an oil seal of the starter motor shown in FIG. 1.
Figure 18:
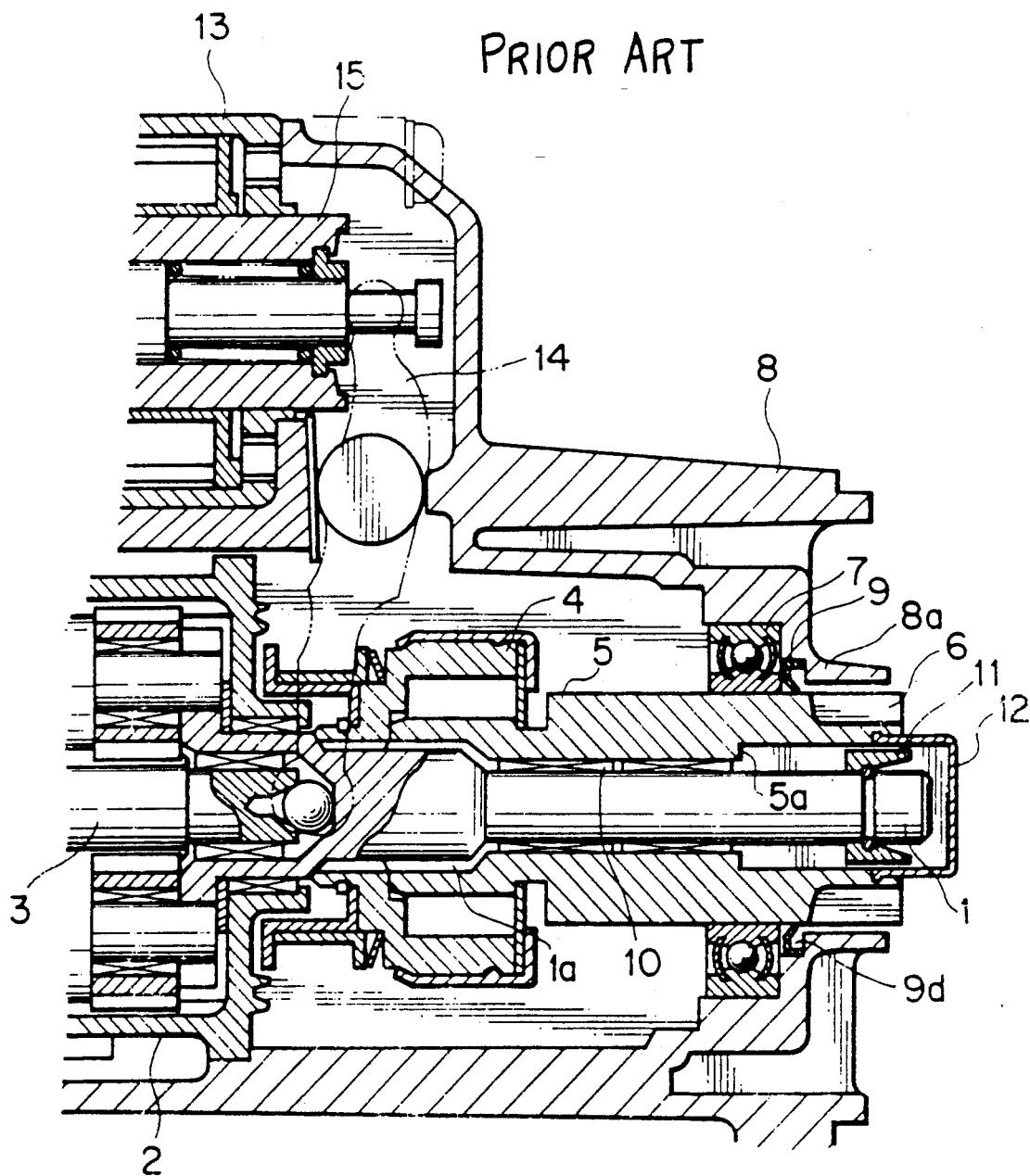
FIG. 18 is a sectional view of part of a conventional starter motor.

Referring first to FIG. 1, there is shown in section part of a starter motor according to a first preferred embodiment of the present invention. Though not particularly shown, the starter motor has a generally similar construction to that of the conventional starter motor shown in FIG. 18 and described hereinabove, and only part of the starter motor which is different front the starter motor shown in FIG. 18 is shown in FIG. 1. This also applies to description of several embodiments of the present invention given hereinbelow. Thus, a pinion 6 is formed at an end of a pinion driving shaft 5, and a ball bearing 7 is fitted in a front bracket 8 which makes part of a machine frame. The ball bearing 7 receives an outer periphery of the pinion driving shaft 5 for axial sliding movement and for rotation with respect to the front bracket 8. The front bracket 8 has an extension 8b extending radially inwardly from a circumferential end edge thereof. The extension 8b of the front bracket 8 constitutes a holding portion for an oil seal described hereinbelow and has a slot or cutaway portion or portions 8c formed at a circumferential portion or portions thereof as shown in FIG. 2. It is to be noted that each of the slots 8c is desirably formed at a location which conforms to the direction of the matrix of the starter motor. An oil seal 16 is fitted in the front bracket 8 and held in sliding contact with the pinion driving shaft 5. The oil seal 16 has such a sectional shape as shown in FIG. 3. In particular, the oil seal 16 is secured at an outer circumferential fixing portion 16a thereof to the front bracket 8, and a front wall 16b extends radially inwardly from a front end of the outer circumferential fixing portion 16a. A contacting portion 16c is formed in a continuous relationship at a radially inward end portion of the front wall 16b and terminates in a lip face. Though not shown, grease for assuring sliding movement of the pinion driving shaft 5 is filled in a spacing 17 defined by the ball bearing 7 and the pinion driving shaft 5 behind the oil seal 16.

With the starter motor having such a construction as described above, since no defined spacing is present in front of the oil seal 16, even if the oil seal is splashed with water from the front side, such water will not stay in front of the oil seal 16. Further, since little spacing is defined between the extension 8b of the front bracket 8 and the pinion 6 and besides the extension 8b has the slots 8c formed therein, water will be discharged outwardly from the slots 8c and will not stay between the extension 8b and the pinion 6. Accordingly, even if the pinion 6 is splashed with water from the front side, such water will be discharged outwardly and will not stay at any location around the oil seal 16. Consequently, admission of water into the inside of the starter motor can be prevented.

Figure 4:
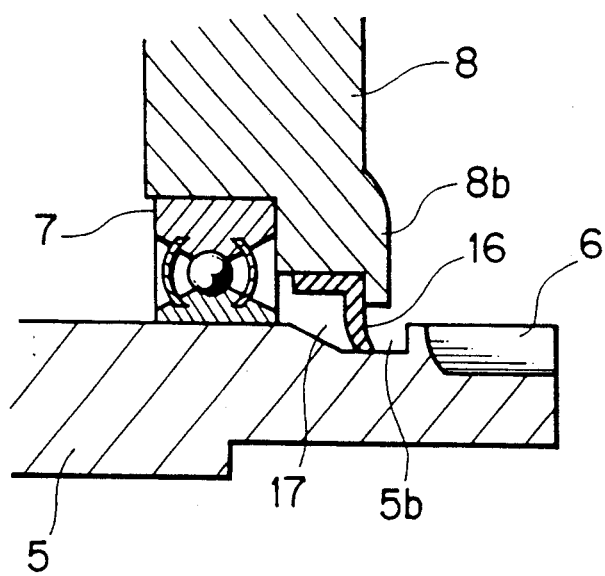
FIG. 4 is a sectional view of part of a starter motor similar to FIG. 1 but showing a second embodiment of the present invention.

Referring now to FIG. 4, there is shown a starter motor according to a second embodiment of the present invention. The starter motor shown is substantially similar in construction to the starter motor shown in FIG. 1 but is different in that a circumferential groove 5b is formed at a location of the pinion driving shaft 5 at which the pinion driving shaft 5 is held in sliding contact with an oil seal 16. The circumferential groove 5b has a predetermined thickness, and the oil seal 16 is disposed such that a contact portion 16c thereof may be positioned within the groove 5b. Though not particularly shown, a slot or cutaway portion similar to the slot 8c shown in FIG. 2 may be formed at any suitable position of an extension 8b of the front bracket 8. With the starter motor having such a construction as described above, since the exposed portion of the oil seal 16 as viewed from the front side is reduced, even when the oil seal 16 is splashed with water from the front side, such water will flow on the extension 8b and will thus be discharged to the outside readily and can be prevented from staying on the front side of the oil seal 16. It is to be noted that, also in the present embodiment, grease for assuring the sliding performance of the pinion driving shaft 5 may be filled in a spacing 17 behind the oil seal 16.

Since in any of the embodiments described above a suitable spacing in which grease can be filled is defined behind the oil seal 16 in this manner, the holding performance of grease is so high that a high sliding performance of the pinion driving shaft 5 will be assured for a long period of time and the reliability will be improved.

It is to be noted that, while the ball bearing 7 in any of the embodiments described above is provided with a seal, otherwise it may not be provided with a seal.

Figure 5:
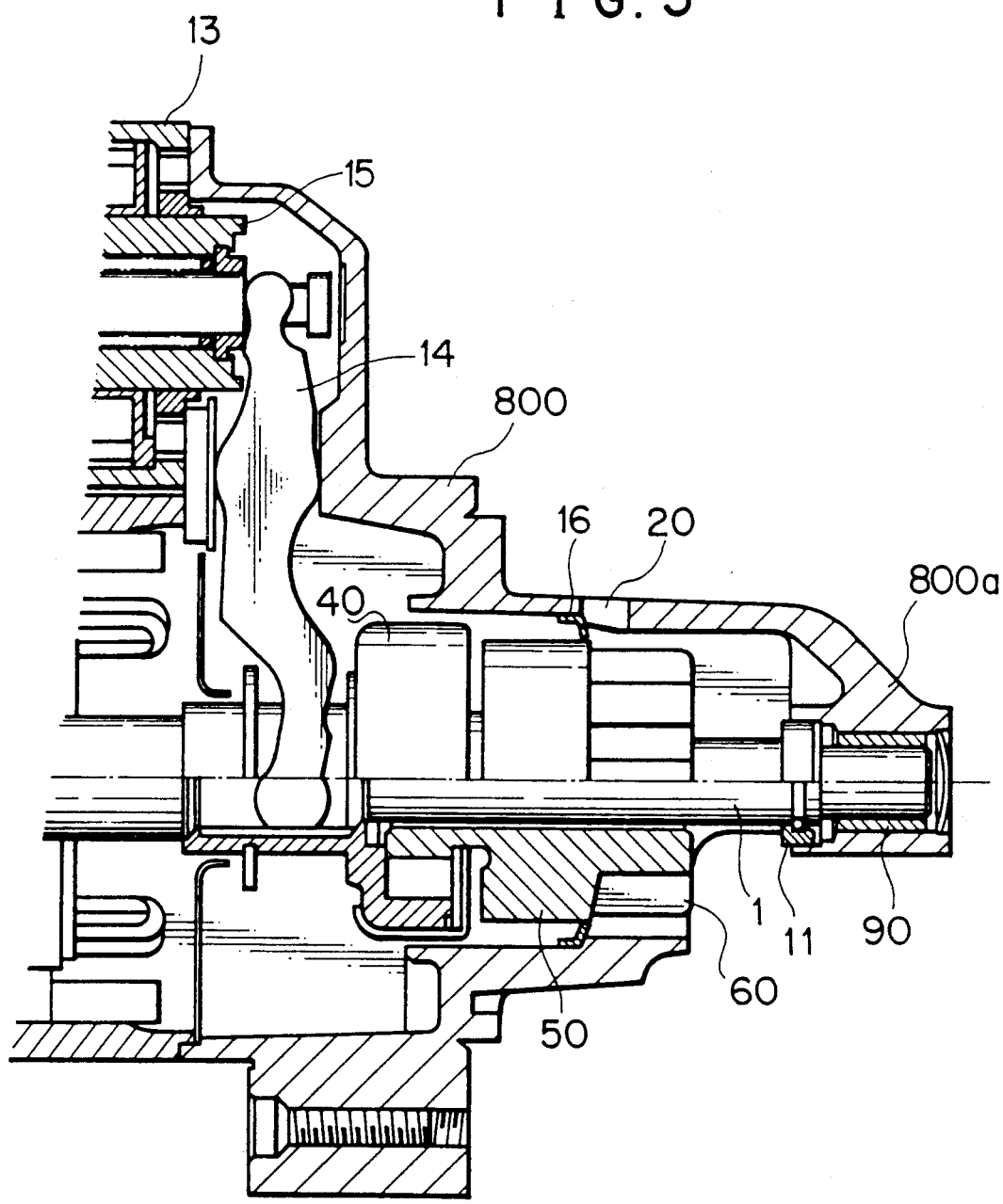
FIG. 5 is a sectional view of part of a starter motor showing a third embodiment of the present invention.

Further, while the starter motor in any of the embodiments described above is described as of the overhang type wherein a pinion is provided at a location forwardly of a bearing, it may be otherwise of the front nose type wherein a supporting portion for an output rotary shaft is provided at a location forwardly of a pinion. A starter motor of the latter type is shown as a third embodiment of the present invention in FIG. 5. Referring to FIG. 5, the starter motor shown includes a front bracket 800, and a bearing 90 fitted in a supporting portion 800a at a front end of the front bracket 800 and supporting thereon a front end portion of an output rotary shaft 1. The starter motor further includes a pinion driving shaft 50 and a pinion 60 which constitute a pinion moving member. An oil seal 16 is mounted on an inner wall of the front bracket 800 and held in sliding contact with an outer periphery of the pinion driving shaft 50. A drain hole or holes 20 (only one is shown) are formed in the front bracket 80 forwardly of the oil seal 16. The starter motor further has an overrunning clutch 40. Construction of the other portion of the starter motor is substantially similar to that of the starter motor shown in FIG. 18, and description thereof is omitted herein. Thus, also with the starter motor of the front nose type, no water will stay in front of the oil seal 16, and similar effects to those of the preceding embodiments can be exhibited.

Figure 6A:
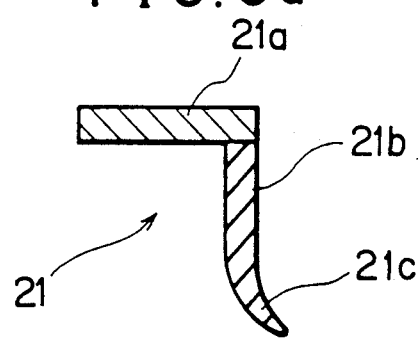
FIGS. 6a, 6b and 6c are sectional views of oil seals which can be incorporated in the starter motor shown in FIG. 5.
Figure 6B:
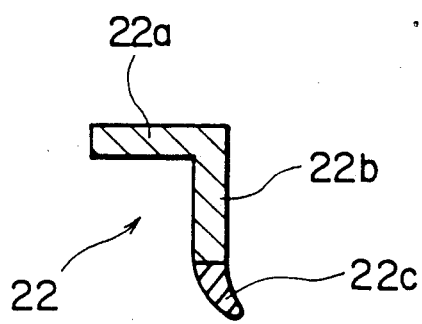
Figure 6C:
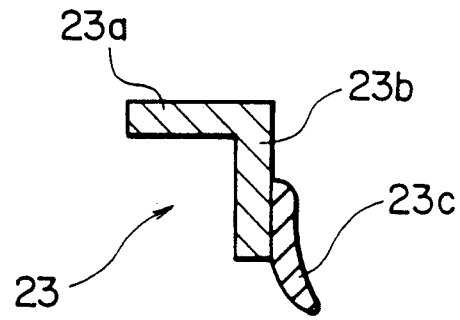

It is to be noted that, while the oil seal 16 is formed as a unitary member of rubber, it need not be of the specific construction and may be constructed in some other configuration. In particular, the oil seal 16 may be replaced by such an oil seal 21 as shown in FIG. 6a wherein an outer circumferential fixing portion 21a is formed from iron while a front wall 21b and a contacting portion 21c are formed continuously from rubber, or by another oil seal 22 shown in FIG. 6b wherein only a contacting portion 22c is formed from rubber while an outer circumferential fixing portion 22a and a front wall 22b are formed from iron, or else by a further oil seal 23 shown in FIG. 6c wherein a contacting portion 23c made of rubber is mounted on the front side of a front wall 23b made of iron. Such modified oil seals as described above exhibit substantially same effects to those of the oil seal 16 described hereinabove.

Further, while the starter motor of any of the embodiments described above exhibits sufficient effects even where it is of the transverse type, the effects are particularly high where the starter motor is of the vertical type.

Figure 7:
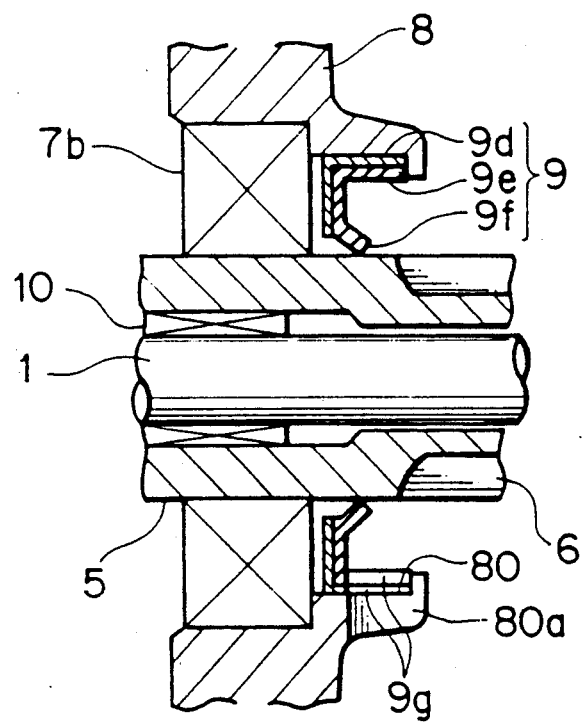
FIG. 7 is a sectional view taken along line 7—7 of FIG. 8 showing a starter motor according to a fourth embodiment of the present invention.
Figure 8:
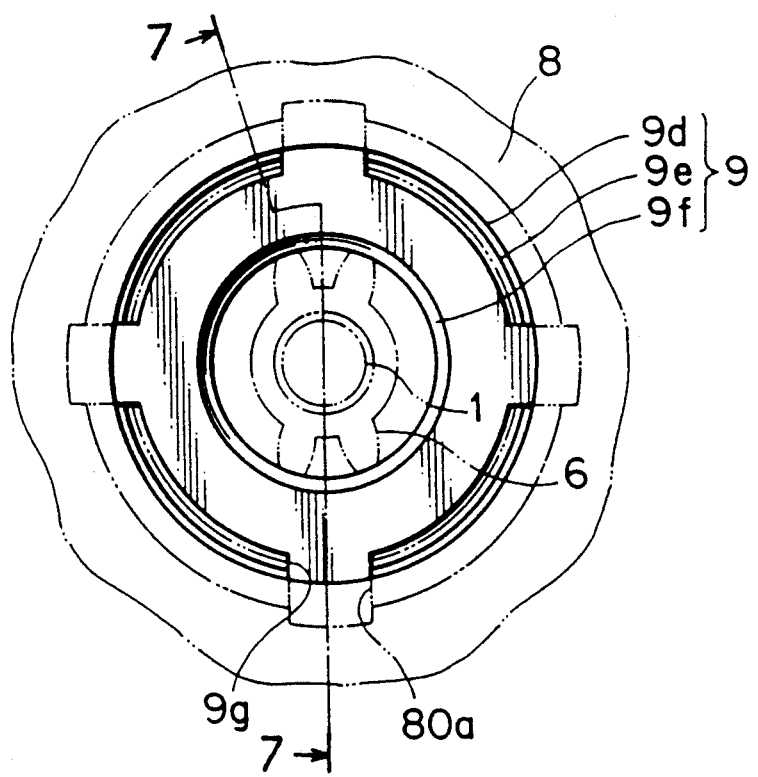
FIG. 8 is a side elevational view of the starter motor shown in FIG. 7.

Referring now to FIGS. 7 and 8, there is shown a starter motor according to a fourth embodiment of the present invention. The starter motor shown includes an oil seal 9 consisting of a holding ring 9d and a rubber sealing member 9e. A plurality of drain slots or cutaway portions 9g are formed in a circumferentially spaced relationship in tubular portions of the holding ring 9d and rubber sealing members 9e. Meanwhile, a plurality of drain slots 80a are formed in an opening portion 80 of a front bracket 8 in a corresponding communicating relationship with the drain slots 9g.

Where the starter motor is installed with the pinion 6 directed upwardly or obliquely upwardly, if water comes to an outer end portion of the oil seal 9, such water will be discharged through the drain slots 9g and the drain slots 80a and will not advance into the inside of the motor.

It is to be noted that while in the present embodiment the drain slots 9g and 80a are formed in the oil seal 9 and the opening portion 80a of the front bracket 8, respectively, mutually communicating drain holes may be formed instead.

Further, while in the present embodiment the oil seal 9 is composed of the holding ring 9d and the rubber sealing member 9e, the holding ring 9d may be omitted while a tubular portion of the rubber sealing member is increased in thickness.

In addition, since in the present embodiment the rotary shaft 1 of the starter motor has an overhang end portion, the structure of the present embodiment can be applied also to a starter motor of a different type wherein a front end portion of a forward extension of a rotary shaft is supported at a forward extension of a front bracket by means of a bearing.

Figure 9:
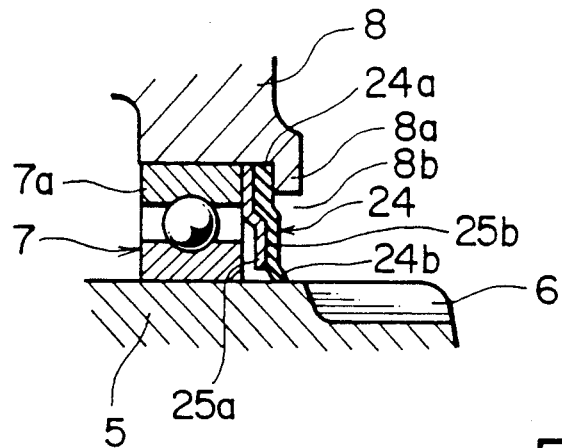
FIG. 9 is a sectional view of an oil seal and associated elements of a starter motor showing a fifth embodiment of the present invention.

Referring now to FIG. 9, there is shown a starter motor according to a fifth embodiment of the present invention. The starter motor shown includes an oil seal 24 mounted such that a radially outer portion thereof is held between an inner side face of a flanged portion 8a of a front bracket 8 and an end face of an outer race 7a of a ball bearing 7. The oil seal 24 is thus held in contact at a portion 24a thereof with the inner side face of the flanged portion 8a of the front bracket 8 and held in sliding contact at a lip portion 24b thereof with an outer periphery of a pinion moving member 5, and an intermediate portion of the oil seal 24 between the contacting portion 24a and the lip portion 24b is formed such that it projects obliquely axially outwardly from the position of the inner side face of the flanged portion 8a. The oil seal 24 is composed of a mounting plate 25a formed from a ring-shaped iron plate and a seal member 25b formed from rubber such as NBR and attached to a surface of the mounting plate 25a. The oil seal 24 is disposed such that the mounting plate 25a thereof is located adjacent the ball bearing 7.

With the starter motor of the embodiment described above, since the intermediate portion of the oil seal 24 between the lip portion 24b and the radially outward portion, that is, the contacting portion 24a held in contact with the inner face of the flanged portion 8a formed on the outer side of an opening portion 8b of the front bracket 8 projects axially outwardly, there is no recessed portion in which water may possibly accumulate. Consequently, even where the starter motor is installed on an engine in such an orientation that the opening portion 8b is directed, for example, upwardly, water or dust coming to the oil seal 24 will drop downwardly as it is, and no water will be received by the oil seal 24. It is to be noted that, in this instance, if the flanged portion 8a is not formed along the entire circumference of the opening portion 8b of the front bracket 8 but formed intermittently along the circumference of the opening portion 8b with several cutaway portions formed therein, then water or dust coming to a surface of the oil seal 24 will be removed more readily and naturally.

Further, with the starter motor of the present embodiment, since the oil seal 24 is disposed such that it is held between the flanged portion 8a of the front bracket 8 and the outer race 7a of the ball bearing 7 on an inner circumferential periphery of the same diameter of the opening portion 8b of the front bracket 8 in which the ball bearing 7 is fitted, when compared with a conventional arrangement wherein an oil seal is disposed on a reduced diameter portion of a pinion moving member in a gap between a ball bearing and a normal diameter portion of the pinion moving member, the number of manhours in production can be reduced and the axial length of the starter motor can be reduced by an amount corresponding to the axial length of such gap.

Figure 10:
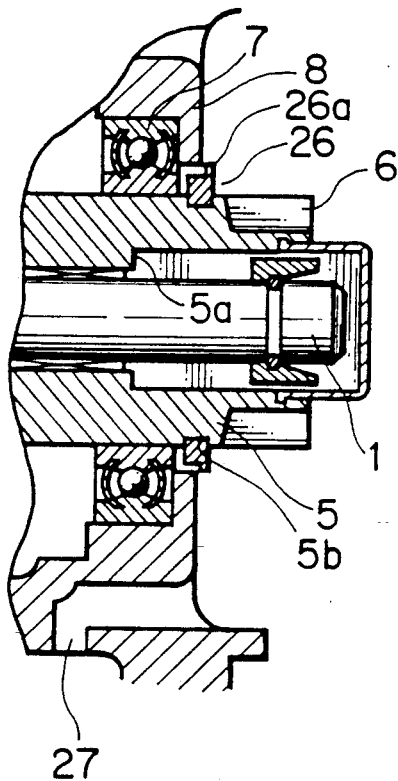
FIG. 10 is a sectional view of part of a starter motor showing a sixth embodiment of the present invention.

Referring now to FIG. 10, there is shown a starter motor according to a sixth embodiment of the present invention. The starter motor shown includes an annular member 26 made of rubber and fitted in a groove formed on a pinion moving shaft 5 rearwardly of a pinion 6. More particularly, the annular member 26 is disposed between a spacing between a front bracket 8 and the pinion moving shaft 5 and has a flanged portion 26a which extends to the front bracket 8 such that it covers over a front face of a ball bearing 7. The outer periphery of the pinion 6 is not covered with such a front end portion of the bracket 8 as the front end portion 8a of the front bracket 8 shown in FIG. 18 and thus remains in an open or exposed condition. The front bracket 8 has a plurality of drain holes 27 (only one is shown) formed therein which extend from a front face to an outer wall of the front bracket 8. Since the other portion of the starter motor is common in construction to that of the starter motor shown in FIG. 18, description thereof is omitted herein.

With the starter motor having such a construction, when it is splashed with water from the front side, such water will flow from a front face of the annular member 26 to the front bracket 8 and will then be discharged outwardly from the drain holes 27. Consequently, little water will be admitted into the inside of the starter motor such as sliding portions between the ball bearing 7 and the pinion driving shaft 5. Accordingly, occurrence of incomplete sliding movement of the pinion driving shaft 5 or the like due to appearance of rust on such sliding faces can be prevented.

Figure 11:
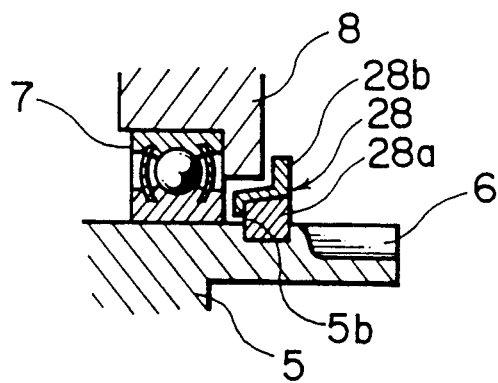
FIG. 11 is a sectional view of part of a starter motor showing a seventh embodiment of the present invention.

Referring now to FIG. 11, there is shown a starter motor according a seventh embodiment of the present invention. The starter motor shown includes an annular member 28 fitted in an annular groove 5b of a pinion driving shaft 5 and consisting of an annular rubber ring 28a serving as a resilient member and another ring 28b made of iron and securely mounted in an integrated relationship on an outer face of the rubber ring 28a by baking. The annular member 28 has a substantially same configuration with the annular member 26 in the preceding embodiment.

With the starter motor having such a construction as described above, since the resilient rubber ring 28a is surrounded by the iron ring 28b, the annular member 28 has a high profile maintaining property, and even if a centrifugal force is applied to the annular member 28 upon starting of the motor, there is no such possibility that the annular member 28 may come out of the groove 5b of the pinion driving shaft 5. Accordingly, the reliability is improved.

Figure 12A:
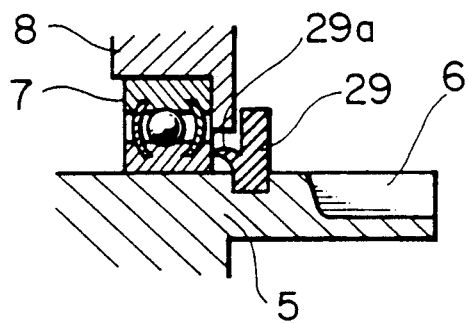
FIGS. 12a, 12b and 12c are sectional views of resilient members which can be incorporated in the starter motor shown in FIG. 10 or FIG. 11.
Figure 12B:
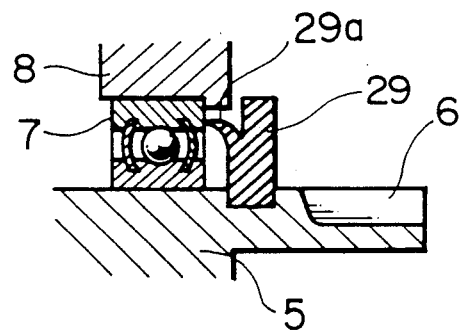
Figure 12C:
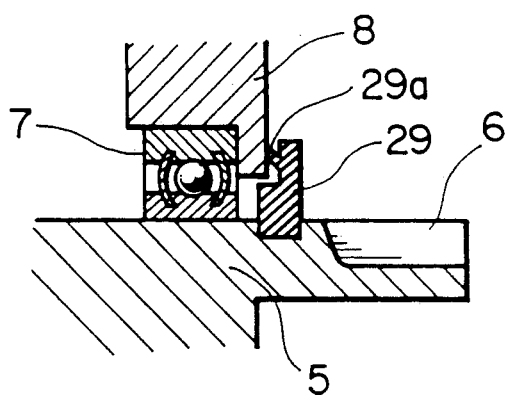

Further, while either of the annular members 26 and 28 in the present embodiment and the preceding embodiment is disposed in a non-contacting relationship with either of the ball bearing 7 and the front bracket 8 such that it covers over the front face of the ball bearing 7, the resilient member thereof may be provided with a lip which is normally held in contact either with the ball bearing 7 or the front bracket 8. Such modifications are illustrated in FIGS. 12a, 12b and 12c. Referring first to FIG. 12a, a modified annular member 29 is made of rubber and has a lip 29a formed in an integrated relationship thereon. The lip 29a of the annular member 29 is held in contact with an inner race of a ball bearing 7. Such lip 29a may be held in contact with an outer race of a ball bearing 7 as shown in FIG. 12b. Or otherwise, such lip 29a may be held in contact with a front face of a front bracket 8 as shown in FIG. 12c. With any of the modified annular members 29, sliding portions between the ball bearing 7 and a pinion driving shaft 5 are held in an enclosure structure, which further improves the waterproof property of the starter motor. It is to be noted that, with any of the modified structures, although the lip 29a of the annular member 29 is normally held in contact with the ball bearing 7 or the front bracket 8, when a pinion 6 is advanced, the lip 29a is moved out of contact with the ball bearing 7 or the front bracket 8 so that no additional sliding resistance is applied to the pinion driving shaft 5.

Further, while rubber is employed for the resilient member in the embodiments shown in FIGS. 10 and 11, any other material or substance such as a plastic material or a resin material can be employed for the resilient member only if it has a sufficient resiliency to allow the same to be fitted into the groove 5b from an outer periphery of the pinion driving shaft 5.

It is to be noted, while any of the starter motors of the embodiments shown in FIGS. 10 and 11 exhibits its effects sufficiently even where it is placed in a transverse installation wherein the axis thereof extends in a horizontal direction, where it is placed otherwise in a vertical installation wherein the axis thereof extends in a vertical direction, it is particularly effective because water from above will be discharged rapidly to the outside and will not stay at an upper portion of the starter motor.

Figure 13:
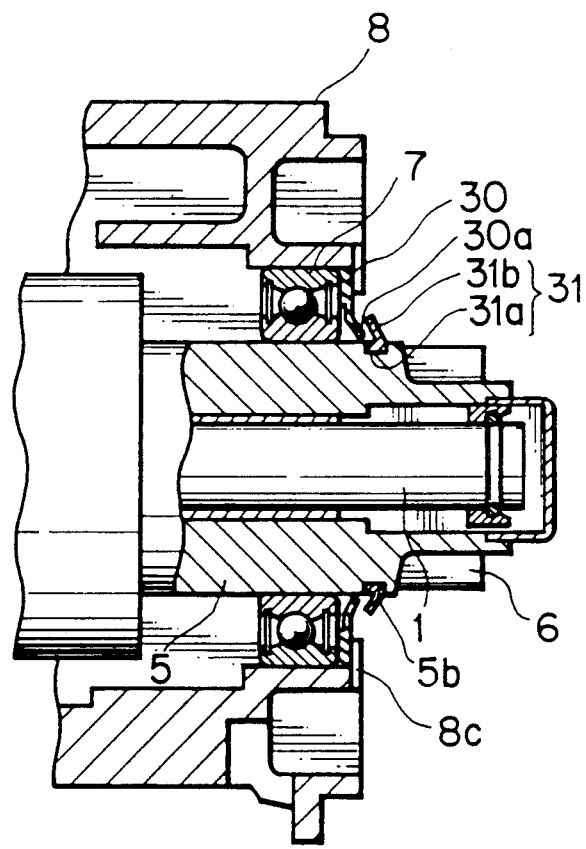
FIG. 13 is a sectional view of part of a starter motor showing an eighth embodiment of the present invention.
Figure 14:
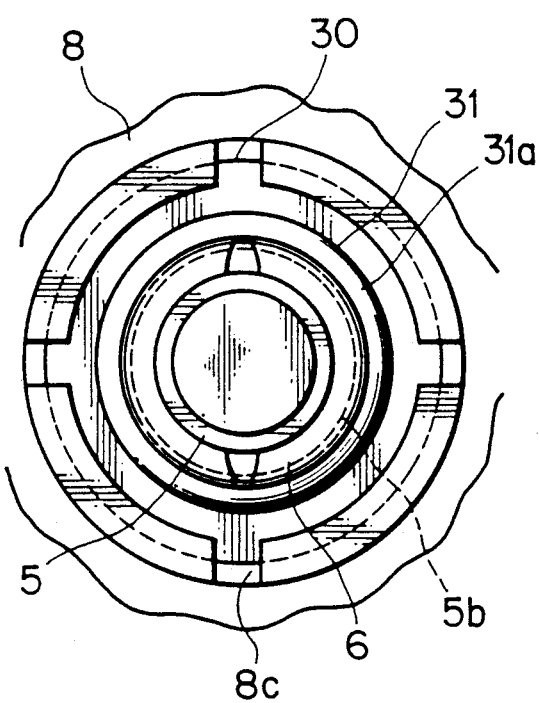
FIG. 14 is side elevational view of the starter motor shown in FIG. 13.

Referring now to FIGS. 13 and 14, there is shown a starter motor according to an eighth embodiment of the present invention. The starter motor shown includes a bearing 7 and an oil seal 30 mounted on an inner circumferential periphery of a front bracket 8. A plurality of drain slots or cutaway portions 8c are formed at a front end portion of the front bracket 8. The starter motor further includes a pinion moving member 5 having a pinion 6 provided at a front end portion thereof and having an annular groove 5b formed on an outer periphery thereof. The starter motor further includes a checking ring 31 made of a resilient material such as rubber. The checking ring 31 has a cylindrical portion 31a fitted in the annular groove 5b of the pinion moving member 5, and a disk portion 31b extending radially outwardly in a rearwardly inclined relationship from a front end of the cylindrical portion 31a. The annular groove 5b is formed at such a location of the pinion moving member 5 that, at such a retracted or home position of the pinion moving member 5 as seen in FIG. 13, the disk portion 31b of the arresting ring 31 covers over the front side of a lip 30a of the oil seal 30.

Thus, external water is prevented from advancing into the inside of the starter motor by way of a location of the lip 30a of the oil seal 30 due to the presence of the waterproof ring 31. Particularly where the starter motor is mounted with the pinion 6 thereof directed upwardly or in an upwardly inclined relationship, water from the outside is prevented from coming to the lip 30a of the oil seal 30 due to the presence of the checking ring 31.

Figure 15A:
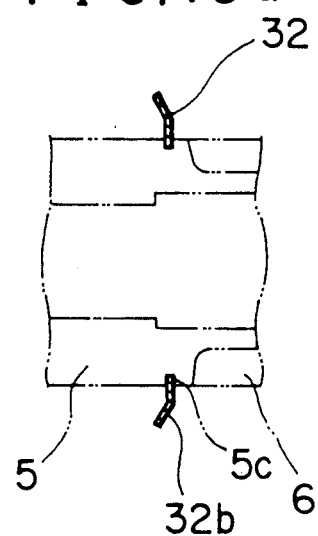
FIGS. 15a and 15b are a sectional view and a front elevational view, respectively, of part of a starter motor showing a ninth embodiment of the present invention.
Figure 15B:
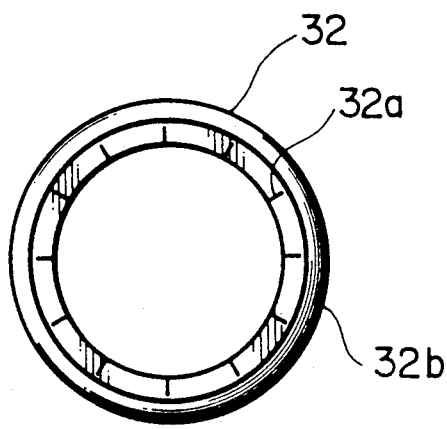

Referring to FIGS. 15a and 15b, there is shown a starter motor according to a ninth embodiment of the present invention. The starter motor shown includes a checking ring 32 made of a metal material having a suitable resiliency. The checking ring 32 has a plurality of cuts 32a formed along an inner circumferential portion thereof, and an outer disk-shaped portion 32b of the checking ring 32 is inclined a little rearwardly as seen in FIG. 15a. The checking ring 32 can thus be fitted readily into an annular groove 5c of a pinion moving member 5 due to resilient deformation of the inner circumferential portion of the checking ring 32. It is to be noted that the disk-shaped portion 32b of the checking ring 32 may otherwise be in a flattened condition.

Figure 16:
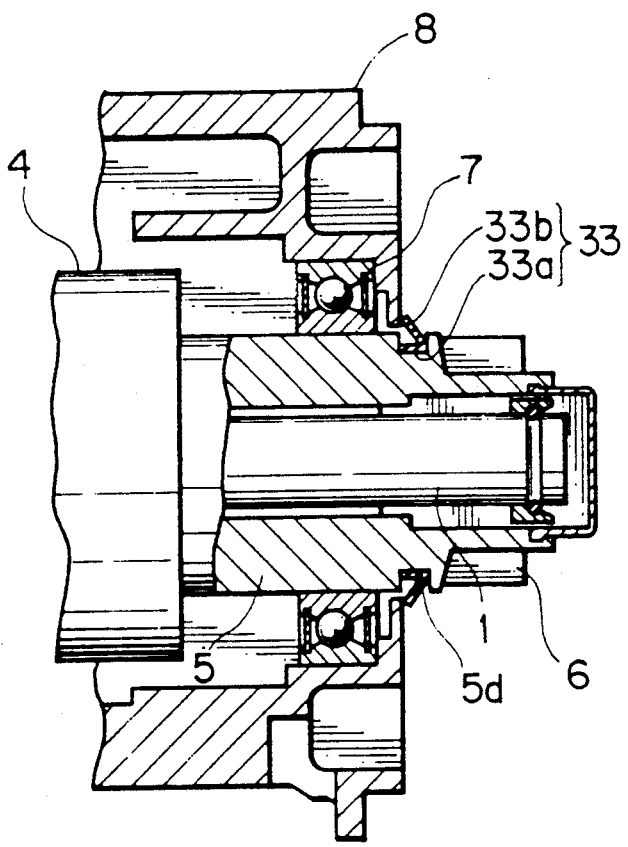
FIG. 16 is a sectional view of part of a starter motor showing a tenth embodiment of the present invention.

FIG. 16 shows a starter motor according to a tenth embodiment of the present invention. Referring to FIG. 16, the starter motor shown includes a pinion moving member 5 having an annular groove 5d formed on an outer periphery thereof. The annular groove 5d has a greater depth than the annular groove 5b shown in FIG. 13. The starter motor further includes a checking ring 33 made of a resilient material such as rubber. The checking ring 33 has a cylindrical portion 33a fitted on the bottom of the annular groove 5d of the pinion moving member 5, and an inclined disk portion 33b extending obliquely radially outwardly from a front end of the cylindrical portion 33a. At a retracted home position of the pinion moving member 5, the inclined disk portion 33b of the retaining member 33 is held in contact at an outer end edge thereof with a front end face of a front bracket 8.

Due to the structure, where the starter motor is mounted in a horizontal orientation or with the pinion 6 directed upwardly or in an upwardly inclined condition, water from the outside will be prevented from entering the inside of the starter motor by the checking ring 33.

Figure 17:
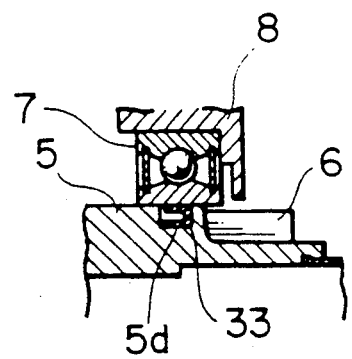
FIG. 17 is a sectional view of part of the motor of FIG. 16 but showing a front bracket being assembled to a pinion moving member.
Figure 19:
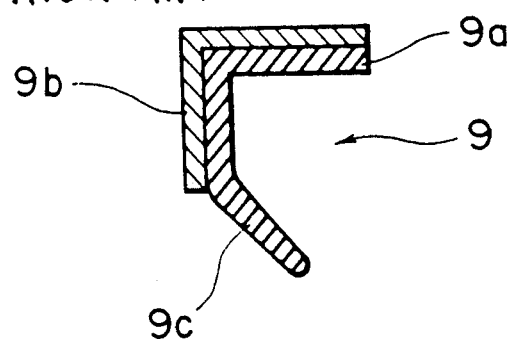
FIG. 19 is a sectional view of an oil seal of the starter motor shown in FIG. 18.

With the arrangement shown in FIG. 16, the front bracket 8 can be mounted, in assembly of the starter motor, in such a condition that an overrunning clutch 4 is mounted on a rotary shaft 1 and the checking ring 33 is fitted in advance in the annular groove 5d of the pinion moving member 5. Referring to FIG. 17, when the front bracket 8 is inserted in the direction indicated by an arrow mark from the front side, the inclined disk portion 33a of the checking ring 33 is at first resiliently deformed inwardly by and along an inner periphery of the bearing 7 to fully retreat into the annular groove 5d of the pinion moving member 5, and after the bearing 7 passes by, the inclined disk portion 33b is resiliently returned to its original condition as seen in FIG. 16.

The front bracket 8 can be assembled with the retaining member 33 fitted in advance on the pinion moving member 5 in this manner. Accordingly, such a situation will not occur that it is forgotten to mount the retaining member 33 onto the pinion moving member 5.

It is to be noted that, while in the embodiment shown in FIG. 16 the checking ring 33 is disposed such that the inclined disk portion 33b thereof is held in contact with an outer end portion of the front bracket 8, it can be applied to such an arrangement wherein the oil seal 30 is provided as shown in FIG. 13.

Further, while the present invention is applied to a starter motor of the speed reducing type in the embodiments described above, it is not limited to such specific starter motor, and similar effects can be exhibited even where the present invention is applied to a starter motor which does not include a reduction gear therein.

Having now fully described the invention, it will be apparent to one of ordinary skill in the art that many changes and modifications can be made thereto without departing from the spirit and scope of the invention as set forth herein.

What is claimed is:

1. A starter motor, comprising: an output rotary shaft (1), a stationary frame (8), a ball bearing (7) secured to said frame, a clutch pinion moving member (5) mounted in a coaxial relationship to said rotary shaft between an outer periphery of said rotary shaft and said ball bearing for sliding movement over a predetermined distance in an axial direction thereof, said clutch pinion moving member having a pinion (6) at a front end thereof, and a generally planar, annular oil seal (24) mounted at a location on said frame forwardly of said ball bearing and extending radially inwardly toward said clutch pinion moving member to seal a location between said frame and said clutch pinion moving member, said frame having a radially inwardly extending flanged portion (8a) at a front end thereof, a radially outermost portion (24a) of said oil seal being sandwiched between and in contact with an inside face of said flanged portion and an end face of an outer race (7a) of said ball bearing, a radially innermost portion of said oil seal terminating in a lip portion (24b) at which said oil seal slidably contacts with an outer periphery of said pinion moving member.

2. A starter motor as claimed in claim 9, wherein said oil seal comprises an annular, rigid mounting plate (25a) in contact with the end face of the outer race of the ball bearing, and an annular, flexible seal member (25b) attached to the mounting plate and in contact with the inside face of the flanged portion.

* * * * *